United States Patent [19]

Kubo

[11] Patent Number: 4,758,122
[45] Date of Patent: Jul. 19, 1988

[54] TOOL CLAMPING APPARATUS

[75] Inventor: Haruaki Kubo, Higashiosaka, Japan

[73] Assignee: Daishowa Seiki Kabushiki Kaisha, Osaka, Japan

[21] Appl. No.: 14,800

[22] Filed: Feb. 13, 1987

[30] Foreign Application Priority Data

Aug. 28, 1985 [JP] Japan .................... 60-131859

[51] Int. Cl.⁴ .............................. B23C 5/26
[52] U.S. Cl. ............................ 409/233; 279/89; 409/231
[58] Field of Search .......... 82/36 R, 36 A, 36 B; 279/89; 409/231–234

[56] References Cited

U.S. PATENT DOCUMENTS 3,311,024 3/1967 Daugherty .................... 409/233

FOREIGN PATENT DOCUMENTS 3406490 8/1985 Fed. Rep. of Germany ...... 409/232

Primary Examiner—Gil Weidenfeld
Assistant Examiner—Steven C. Bishop
Attorney, Agent, or Firm—Koda & Androlia

[57] ABSTRACT

A clamping apparatus for clamping the attachment for mounting the tool to the part to which the tool is mounted of the machine tools is disclosed. The attachment for mounting the tool is coaxially provided with the taper extruding shafts which are fitted into the taper hole of the part to which the tool is mounted and the holding shafts the peripheral part on the tip end of which has the holding claw being laterally extruded. The clamping cylindrical article equipped with the claw to be held whose engagement with the holding claw, introduced by the fixed angular amount of forward rotation of the clamping cylindrical article, allows the attachment for mounting the tool to be prevented from coming off, is disposed in the part to which the tool is mounted such that the clamping cylindrical article may be rotatable and axially movable. The rotational driving means with the forcing mechanism which rotates forward the clamping cylindrical article to be inwardly drawn in and/or rotates backward the same to be pushed to come out is provided.

8 Claims, 5 Drawing Sheets

TOOL CLAMPING APPARATUS

BACKGROUND OF THE INVENTION

1. (Field of the Invention)

The present invention relates to a tool clamping apparatus for clamping firmly an attachment for mounting a tool which is mounted, for example, to a part to which the tool is mounted of NC machine tools, e.g. a tool post by a manipulator of an automatic tool changer, to the afore-mentioned tool post.

2. (Description of the Prior Art)

The attachment for mounting the tool, for example, which is mounted to the tool post of a numerically controlled turret lathe by the manipulator of the automatic tool changer is equipped with a taper extruding shaft part capable of being closely fitted into a hollow taper hole of the afore-mentioned tool post. For this reason, in order to clamp the afore-mentioned attachment for mounting the tool, the afore-mentioned taper extruding shaft part which is adapted to be fitted into the afore-mentioned taper hole is pulled into an internal area, thereby fitting closely both into each other, and, if necessary, a mutual surface contact is performed between annular end faces, which are formed around a shaft center, of the side of the afore-mentioned attachment for mounting the tool and the side of the afore-mentioned tool post.

Conventionally, this kind of tool clamping apparatus has used a pulling-in shaft which may be detachably mounted to the tip end of the afore-mentioned extruding shaft and a plurality of belleville springs which pull said pulling-in shaft into the internal area as a means of pulling the taper extruding shaft part of the afore-mentioned attachment of mounting the tool. Such a clamping apparatus utilizing the conventional belleville springs give rise to an danger of loosening the clamping force for the attachment for mounting the tool in an unexpected manner so that it is problematic in terms of the safety in the case of a heavy duty cutting in which a cutting force of a cutting tool mounted to the attachment for mounting the tool is more powerful than a spring force of the afore-mentioned belleville springs, or where it is applied to the machine tools using the cutting tool which is large in extruding amount for machining. Furthermore, there is a difficulty in applying it to the attachment for mounting the tool equipped with a tool driving shaft which penetrates the central part, because it has the afore-mentioned pulling-in shaft and group of belleville springs arranged on the center line, and, generally, its possibly applicable scope is only within the machine tools whose system drives and rotates the attachment for mounting the tool itself, i.e. the machine tools equipped with the tool post which is driven to be rotated.

SUMMARY OF THE INVENTION

Accordingly, the purpose of the present invention is to provide the tool clamping apparatus capable not only of clamping extremely firmly the attachment for mounting the tool to the part to which the tool is mounted but of being used safely as the clamping apparatus for the attachment for mounting the tool in the machine tools which performs the heavy duty cutting and the machining being large in extruding amount by means of the afore-mentioned clamping.

The further purpose of the present invention is to provide the tool clamping apparatus which can perform smoothly and quickly the clamping action and, at the same time, is longer in durable life.

The still further purpose of the present invention is to provide the tool clamping apparatus which may be easily applied to the rotary type attachment for mounting the tool whose central part is penetrated by the tool driving shaft.

The afore-mentioned purposes, other purposes, and characteristics of the present invention may be apparent from the following detailed description made in conjunction with the accompanying drawings:

BRIEF DESCRIPTION OF THE INVENTION

DETAILED DESCRIPTION OF THE INVENTION

Figure 1:
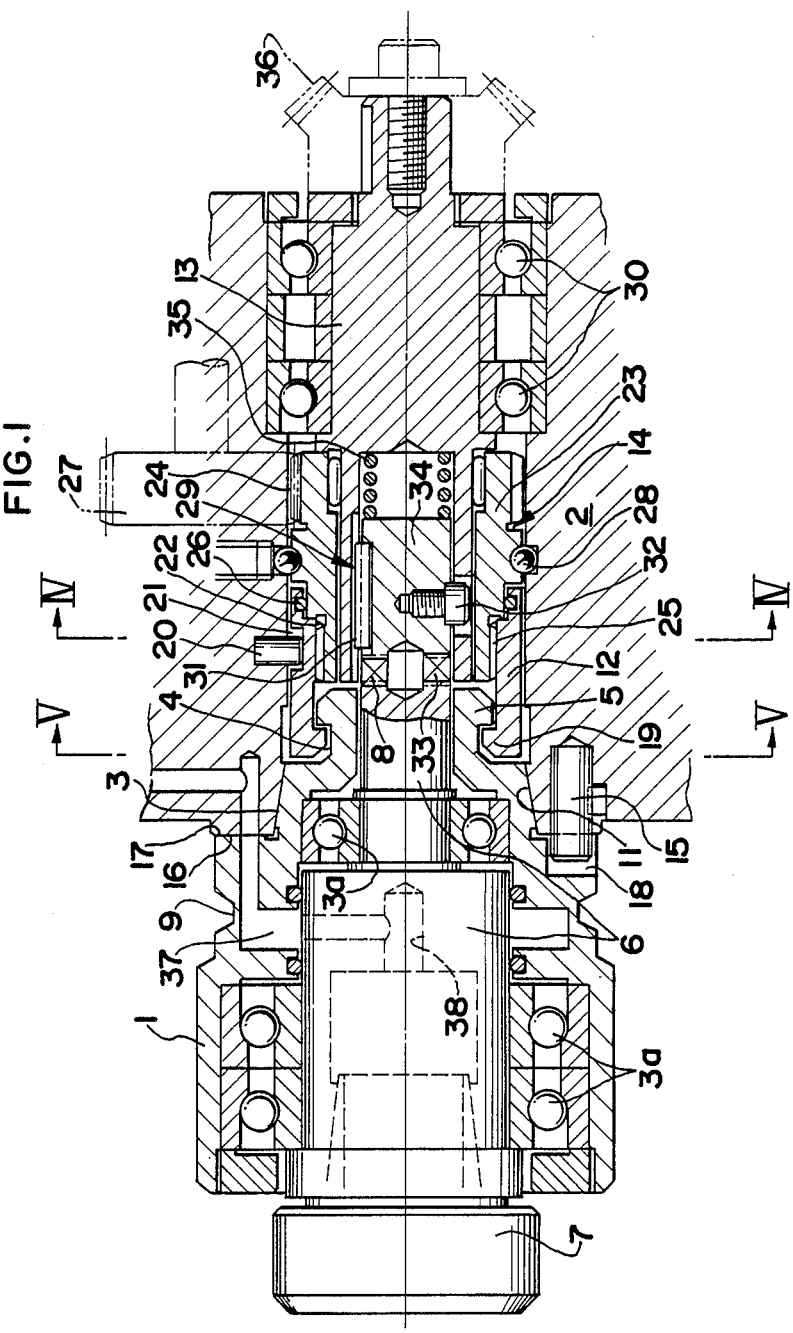
FIG. 1 is a longitudinal sectional view of the preferred embodiment of the present invention.

In FIGS. 1 to 5, 1 is the attachment for mounting the tool, and 2 is the tool post on the side of the machine tools. The internal end parts of the afore-mentioned attachment for mounting the tool 1 are concentrically provided with the taper extruding shafts 3 and holding shafts 4 of smaller diameter which are further extruded from said taper extruding shafts 3 in a continuous manner, and holding claws 5, of adequate length in a circumferential direction, which are laterally extruded, are extendedly provided on two diametral places of the tip ends of the afore-mentioned holding shafts 4. The tool driving shaft 6 penetrates concentrically the inside of the afore-mentioned attachment 1, being detachably and rotatably supported by bearings 3a, and the external end of the tool driving shaft 6 is equipped with a tool grasping unit 7, while the internal end of the tool driving shaft 6 which is extruded from the afore-mentioned holding shaft 4 is furnished with clutch claws 8 and 33. 9 is a part for grasping the manipulator which is formed on the afore-mentioned attachment for mounting the tool.

The afore-mentioned tool post 2 is equipped with the hollow taper hole 11 into which the taper extruding shafts 3 of the afore-mentioned attachment for mounting the tool 1 can be closely fitted, has its internal side provided with a clamping cylindrical article 12 and a driving shaft 13, and a rotational driving means with a mechanism of forcing the clamping cylindrical article 12 to be axially moved in a longitudinal direction 14. 15 is a turn stopping pin, being extruded from an annular end face of the tool post 2, which is fitted into a concave part 18 which is formed on an internal annular end face 17 of the part for grasping the manipulator 9 of the afore-mentioned attachment for mounting the tool 1.

The afore-mentioned clamping cylindrical article 12 has external end parts capable of being outwardly in mesh with the holding shafts 4 including the holding claws 5 on the side of the afore-mentioned attachment 1 and has external end edges of said external end parts provided extendedly with claws to be held 19 whose fixed angularly forward rotation allows themselves to be held in the afore-mentioned holding claws 5, while these claws 5 and 19 are axially overlapped each other such that said external end edges are inwardly directed in a radial direction. Furthermore, as shown in FIG. 2, the external peripheral surface of the clamping cylindrical article 12 is provided with a groove part 21, of diamond-shape from plan view, whose holding with a stopper pin 20 being extruded from the side of the afore-mentioned tool post 2 permits the ranges of the forward and backward rotation and the axial movement of said clamping cylindrical article 12 to be restricted and the internal peripheral part nearer to the internal end of said clamping cylindrical article 12 is furnished with a female-tapped hole 22.

Figure 2:
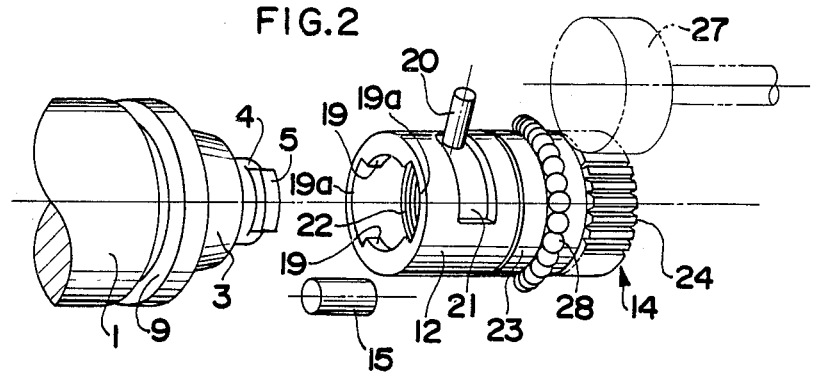
FIG. 2 is an exploded perspective view of the clamping part in the tool clamping apparatus shown in FIG. 1.

The afore-mentioned rotational driving means with the mechanism of forcing the clamping cylindrical article 12 to be axially moved in a longitudinal direction 14 is constituted by a rotational article 23 which is detachably supported in the afore-mentioned tool post 2 such that said rotational article 23 can be only rotated, having its tip end part fitted into the afore-mentioned clamping article 12, a pinion gear 24 which is formed around the external peripheral part on the internal end part of the rotational article 23, a male-tapped shaft 25, being formed on the external peripheral part on the tip end of the rotational article 23, which is screwed with the female-tapped hole 22 of the afore-mentioned clamping cylindrical article 12, braking O-rings 26 which are mounted on the sides respectively of the internal peripheral surface of the afore-mentioned clamping cylindrical article 12 such that said braking O-rings 26 get in pressurized contact with the external peripheral surface of the afore-mentioned rotational article 23, and the afore-mentioned pinion gear 24 is adapted to be in mesh with such a driving gear 27 as shown by a virtual line of FIGS. 1 and 2. 28 is thrust balls which are interposed between the rotational article 23 and tool post 2 in order to obstruct an axial movement of said rotational article 23.

Figure 3:
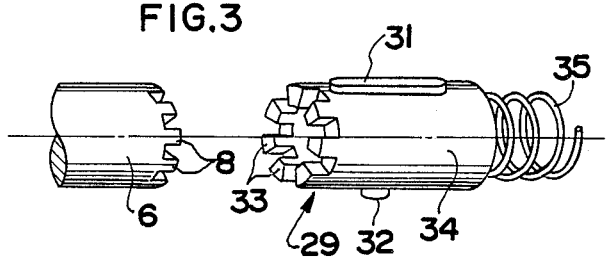
FIG. 3 is a perspective view of a tool driving shaft and a clutch mechanism in the tool clamping apparatus of FIG. 1.
Figure 4:
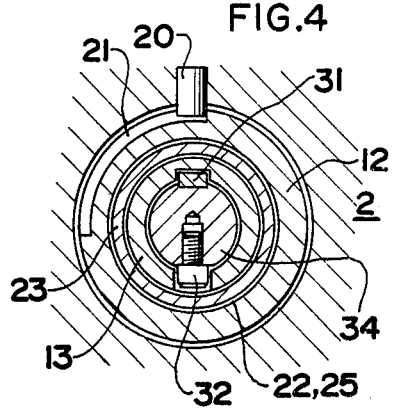
FIGS. 4 and 5 are sectional views taken on lines IV—IV and V—V respectively of FIG. 1.

As shown in FIG. 1, the inside of the tip end part of the afore-mentioned driving spindle 13 is provided with a clutch mechanism 29, and said tip end part is detachably supported by way of bearings 30 in the tool post 2, while it penetrates the inside of the afore-mentioned rotational article 23. The afore-mentioned clutch mechanism 29 is, as shown in FIG. 3, constituted by a movable article 34 which not only is fitted concentrically by way of a transmission key 31 and a slipping-out preventive stopper 32 into the afore-mentioned driving spindle 13 such that said movable article can be moved only in an axial direction to the fixed extent but also is equipped with a clutch claw 33 which is to be in mesh with the clutch claw 8 on the side of the afore-mentioned tool driving shaft 6 and springs 35 which force said movable article 34 to be outwardly moved. The driving spindle 13 can be rotationally driven by way of gears 36 being mounted to the free ends thereof. In FIG. 1 37 is an oil flowing port which enables lubricating oil to be supplied through the port 38 being provided on the tool driving shaft 6 to a cutting tool with the oil hole.

A description of the method of using the apparatus of the present invention will show that, while the clamping cylindrical article 12 is in the state of being located at the commencement of the forward rotation, the attachment for mounting the tool 1 is mounted to the tool post 2 such that the annular end face 17 is opposite to the annular end face 16 on the side of the tool post 2 as well as the turn stopping pin 15 on the side of the tool post 2 is fitted into the concave part 18. As a result, at the same time when the taper extruding shafts 3 are fitted into the hollow taper hole 11 of the tool post 2, the holding claws 5 of the holding shafts 4, passed through the inserting parts 19a and 19a between the claws to be held of the clamping cylindrical article 12, are fitted into said clamping cylindrical article 12.

Figure 5:
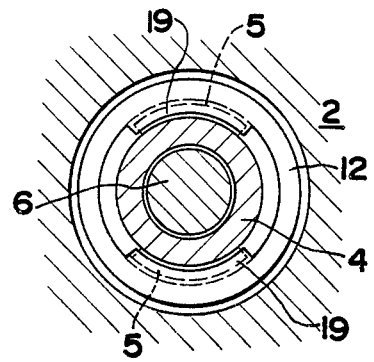

Under such an arrangement, if the rotational article 23 is caused to be rotated forward by the driving gear 27, by way of a frictional force of the braking O-rings 26, the clamping cylindrical article 12 is rotated forward integrally with the rotational article 23, and, as shown in FIG. 1, the claws to be held 19, lapping over the external side of the holding claws 5 on the side of the attachment for mounting the tool 1, are rotated to and fro. When the stopper pin 20 gets in contact with the end part of restricting the forward rotation of the diamond-shaped groove part 21, as shown in FIG. 5, the claws to be held 19 are in turn fully lapped axially over the holding claws 5.

Upon being obstructed of the forward rotation of the clamping cylindrical article 12 by the stopper pin 20, a sliding of the rotational article 23 with respect to the O-rings, resulting in a forward rotation only of the rotational article 23 concurrently with a rotation of the clamping cylindrical article 12 being still obstructed, and, for this reason, the male-tapped shaft 25 of the rotational article 23 is rotated forward with respect to the female-tapped hole 22 of the clamping cylindrical article 12, whereby the clamping cylindrical article 12 is drawn in inwardly along an axial direction. As a result, as shown in FIG. 1, at the same time when the claws to be held 19 of said clamping cylindrical article 12 draw in inwardly the attachment for mounting the tool 1 by way of the holding claws 5 and the taper extruding shafts 3 of the attachment for mounting the tool 1 are closely touched with the hollow taper hole 11, a mutual surface contact between the annular end face 16 on the side of the tool post 2 and the annular end face 17 on the side of the attachment for mounting the tool 1 is made. Under such a state, a drive of rotating forward the rotational article 23 being stopped, a recommendable construction is that an incorporation of a torque limiter into the drives of the driving gear 27 or using a torque motor will enable an overload to be automatically avoided, even if a timing of stopping the drive of the rotational article 23 is delayed.

As shown in the present embodiment, when the attachment for mounting the tool 1 is provided with the tool driving shaft 6 which drives the tool grasping unit 7, the driving spindle 13 on the tool post 2 and the afore-mentioned tool driving shaft 6 are automatically connected by way of the clutch mechanism 29 to each other, when the attachment for mounting the tool 1 is mounted to the tool post 2. Namely, an aimed arrangement is that the clutch claw 8 on the side of the tool driving shaft 6 is held in the clutch claw 33 on the side of the driving spindle 13, and, even if the phases of both the claws 8 and 33 do not accord with each other, the clutch claw 8 on the side of the tool driving shaft 6 pushes the movable article 34 of the clutch mechanism 29 to make a moving retreat against a force of the springs 35, while a rotation of the driving spindle 13 allows the phases of both the claws 8 and 33 to accord with each other, at the time of which the movable article 34 is forced to make a moving advance by an action of the springs 35 so that an automatic engagement between both the clutch claws 8 and 33 is attained.

Thus, a rotational driving of the driving spindle 13, made by way of the gears 36, will permit its rotational force to be transmitted by way of the clutch claws 33 and 8 to the tool driving shaft 6 on the side of the attachment for mounting the tool 1, thereby making it possible to drive rotationally the tool grasping unit 7.

When releasing the attachment for mounting the tool 1 from the tool post 2, the rotational article 23 is be rotated backward from the position of limiting its forward rotation. As a result, the male-tapped shaft 25 of said rotational article 23 is rotated reversively with respect to the female-tapped hole of the clamping cylindrical article 12, thereby pushing the clamping cylindrical article 12 to come out. Subsequently, when the claw to be held 19 of the clamping cylindrical article 12 gets axially out of touch with the holding claw 5 on the side of the attachment for mounting the tool 1 so that a rotational resistance to the clamping cylindrical article 12 is lowered, by way of a frictional force of the braking O-rings 26, the clamping cylindrical article 12 is backward rotated integrally with the rotational article 23. When the clamping cylindrical article 12 is rotated to the position of limiting the backward rotation at which its rotation is limited by the stopper pin 20, the claw to be held 19 on the side of the clamping cylindrical article 12 gets axially out of touch with the holding claw on the side of the attachment of mounting the tool 1, the resulting state being that the holding shafts 4 on the attachment for mounting the tool 1 can be drawn out from the clamping cylindrical article 12.

Under such a state, a driven backward rotation imparted to the rotational article 23 is stopped, and the manipulator allows the attachment for mounting the tool 1 to be drawn away from the tool post 2.

Figure 6:
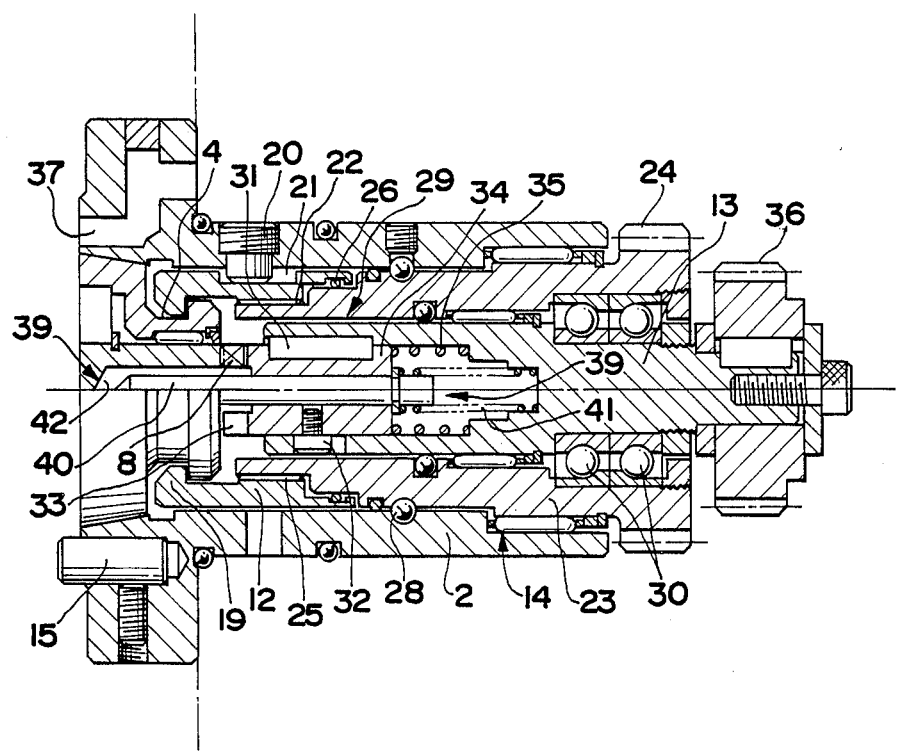
FIGS. 6 and 7 are longitudinal sectional views of other embodiments respectively of the present invention.

The tool clamping apparatus shown in FIG. 6, whose structure is almost identical to that of the afore-mentioned embodiment, is different therefrom in an arrangement in which a guide means 39 is provided to have the attachment for mounting the tool 1 smoothly fitted into the tool post 2. For this reason, a description in which a concentration is put only upon different points without an execution of the repeated description as to the constituent element thereof identical to that of the embodiment of FIG. 1 with the same reference numbers applied thereto, may show that a guide pin 40 is movably inserted axially through the central part of the movable article 34, the element constituting the clutch mechanism 29, such that its tip end part is outwardly extruded from the claws to be held 19, and buffer springs 41 are applied to its rear end part, thereby pressing it always in an outward direction. A guide hole 42 into which the afore-mentioned guide pin 40 is fitted is provided on the rear end part of the tool driving shaft 6 of the attachment for mounting the tool 1, being axially directed from the end face thereof. Such a provision of the guide means 39 which is constituted by the guide pin 40 being pressed by the buffer springs 41 and the guide hole 42 into which said guide pin 40 is fitted allows the attachment for mounting the tool 1 to be smoothly and accurately fitted into the tool post 2, while being held in the manipulator. Furthermore, according to this embodiment, apparently from such a stated as illustrated in FIG. 6, the gears 24 for rotating the rotational article 23 of the means 14 and the gears 36 for rotating the driving spindle 13 are provided to adjoin to each other. In that case, an accepted option is, of course, that both the gears 24 and 36 are bevel gears in place of the illustrated spur gears.

Figure 7:
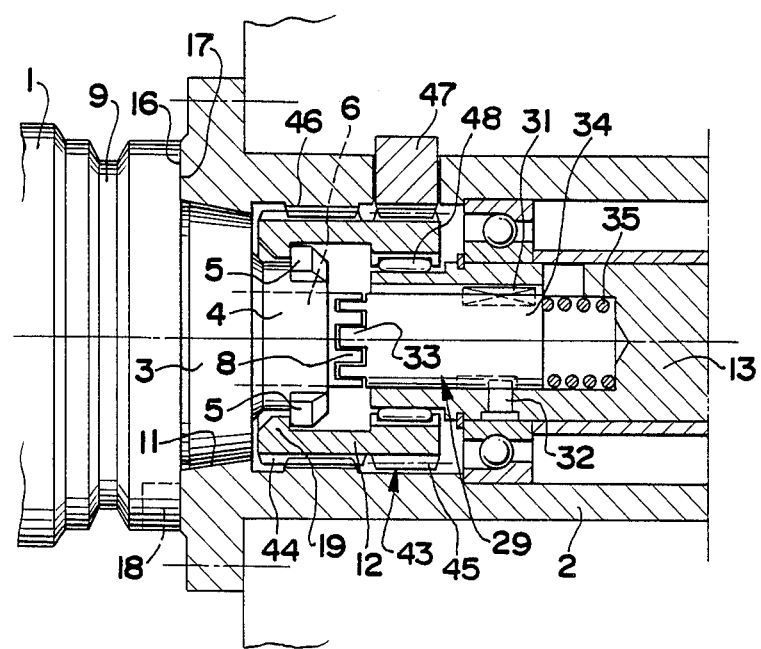

According to a further embodiment as shown in FIG. 7, as the rotational driving means with the mechanism of forcing the clamping cylindrical article 12 to be axially moved in a longitudinal direction 43, the male-tapped shafts 44 which are directly formed on the external periphery of said clamping cylindrical article 12, the pinion gears 45, and the female-tapped hole 46 which is provided on the internal periphery of the tool post 2 such that the afore-mentioned male-tapped shafts 38 are screwed with said female-tapped hole 46 are provided, the construction being that a driving rack gear 47 in mesh with the afore-mentioned pinion gear 45 allows the afore-mentioned clamping cylindrical article 12 to be driven to be rotated backward and/or forward. 48 is needle bearings which support the clamping cylindrical article 12 to the driving spindle 13 such that said clamping cylindrical article 12 can be rotated and axially moved.

Under the embodiment of FIG. 7, the construction must be made such that, since upon being operated of the clamping cylindrical article 12, said clamping cylindrical article 12 is axially moved, while it is being rotated, at its approximately 90° of rotational angle during the range of which the claw to be held 19 has reached the position of lapping completely over the holding claw 5, the necessary amount of drawing-in action of the attachment for mounting the tool 1, performed by the afore-mentioned claw to be held 19, should be completed.

Figure 8:
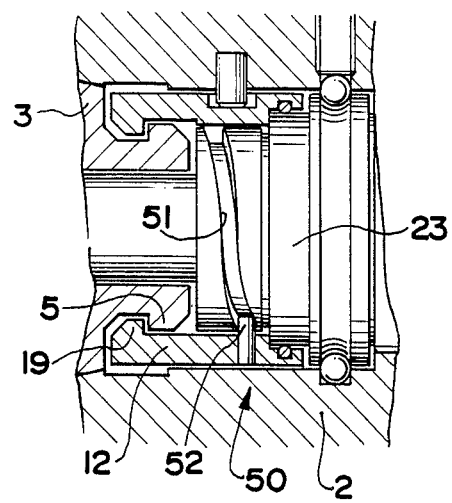
FIGS. 8 and 9 are longitudinal sectional views of the principal parts in still other embodiments respectively of the present invention.

Referring to FIG. 8, which illustrates another embodiment of the rotational driving means with the mechanism of forcing the clamping cylindrical article 12 to be axially moved in a longitudinal direction 50, in place of the afore-mentioned screw mechanism, an accepted option is that under an arrangement that a cam groove 51 is provided on the external peripheral surface of the rotational article 23 and a cam pin 52 which is fitted into the afore-mentioned cam groove 51 is provided on the internal peripheral part of the clamping cylindrical article 12 corresponding to the cam groove 51, a forward and backward rotation of the rotational article 23 allows the clamping cylindrical article 12 by way of the afore-mentioned cam mechanism to be axially moved forward and backward in a forcible manner. Since the other structure of the afore-mentioned embodiment is identical to that of the embodiment as shown in FIG. 1, a description of the former structure is omitted with the same reference numbers applied thereto.

Figure 9:
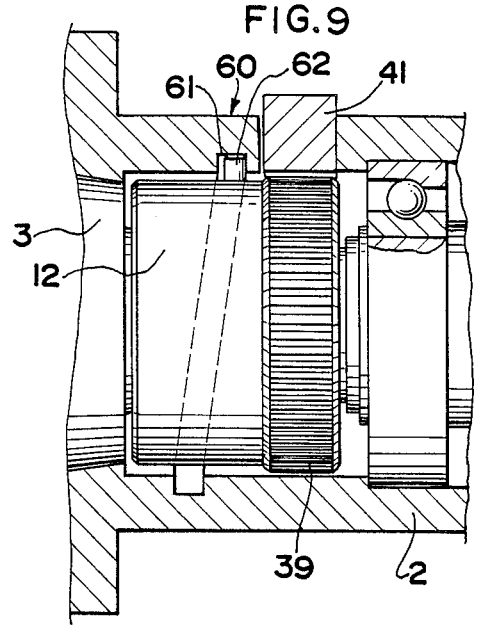

Referring to FIG. 9, which illustrates still another embodiment of the rotational driving means with the mechanism of forcing the clamping cylindrical article 12 to be axially moved in a longitudinal direction 60, another accepted option is that under an arrangement that the cam groove 61 is provided on the internal peripheral surface of the tool post 2 and the cam pin 62 which is fitted into the afore-mentioned cam groove 61 is provided on the external peripheral part of the clamping cylindrical article 12 corresponding to the cam groove 61, a forward and backward rotation of the clamping cylindrical article 12 by way of the afore-mentioned cam mechanism to be axially moved forward and backward in a forcible manner. Since the other structure of the afore-mentioned embodiment is identical to that of the embodiment as shown in FIG. 1, a description of the former structure is omitted with the same reference numbers applied thereto.

The embodiments previously referred to have the tool driving shaft 6 provided on the inside of the attachment for mounting the tool 1, but that is not a necessary condition to the present invention. An attachment to which a fixing tool is only required to be mounted directly to the attachment for mounting the tool 1. In addition, the rotational driving means with the forcing mechanism which moves axially the clamping cylindrical article 12 at the same time of rotating forward and/or backward the same is not limited to such means as shown in the embodiments. For this reason, as the rotational article 23 and the driving method of rotating forward and/or backward the clamping cylindrical article 12, in addition to a gear driving system such as the pinion gear, the rack gear and the like, a lever driving system and a system wherein the rotational article 23 is prolonged until the rear end of the tool post 2 and the driving shaft is axially held directly in the end of said rotational article 23 may be adopted.

As shown in the embodiments, the clamping apparatus according to the present invention can be easily applied to the attachment for mounting the rotational tool which is equipped with the tool driving shaft, and makes various of tooling possible. Furthermore, in the case of using the attachment for mounting the rotational tool, since such an attachment is fixed to the part to which the tool is mounted on the side of the machine tools being not rotated (to the tool post 2 under the embodiment), there is no necessity of performing an orientation of the tool driving shaft at the time of the automatic tool changing work, a control of the tool drives comes to be made easily as well as can be economically executed, and the part to which the tool is mounted (the tool post 2 under the embodiment) can be used for the rotational tool and the fixed tool at the same time.

What is claimed is:

1. A tool clamping apparatus for a machine tool used with a tool mounting attachment which is adapted to be clamped to a tool mounted part with an inwards narrower opening therein of the machine tool, said tool clamping apparatus comprising:
    a protruding portion and a connected portion formed integrally with said attachment, the protruding portion having an outer surface tapered so as to fit into said opening of the tool mounted part while the connected portion has a curved associated piece projecting externally thereround;
    a clamping cylindrical article which is provided inside said tool mounted part of the machine tool in such a manner as to be capable of rotating as well as moving axially forwards and backwards, the clamping cylindrical article having a curved associated piece projecting internally thereround, corresponding to said covered piece of the connected portion, wherein the clamping cylindrical article is caused to rotate for a predetermined angle when the associated piece of the clamping article overlaps the connected portion except for the associated piece of the attachment so that an engagement of both the curved associated pieces of the clamping cylindrical article and said connected portion opposite to one another is performed, whereby said attachment can be prevented from moving apart from the tool mounted part of the machine tool; and
    a rotational driving means for driving said clamping cylindrical article in both the predetermined and reverse rotational directions, the rotational driving means having a forcing mechanism which draws in the clamping article when rotated in a predetermined direction and pushes out the article when rotated in the reverse direction.

2. A tool clamping apparatus as defined in claim 1, wherein said tool mounting attachment has a tool driving shaft accommodated therein with one end of the tool driving shaft penetrated concentrically into the connected portion thereof, while said tool mounted part of the machine tool is provided concentrically with a tool driving spindle and a clutch mechanism provided in one end of the driving spindle which detachably connects the driving spindle with the tool driving shaft of the attachment.

3. A tool clamping apparatus as defined in claim 1 or 2, wherein said rotational driving means comprises:
    a rotational article being supported in an only rotatable state in the tool mounted part of the machine tool while one end of the rotational article is fitted into said clamping cylindrical article, one end of the rotational article having a male thread defined on an external surface thereof while another end having a transmission gear provided on an outside through which the rotational article can be rotated by a driving gear;
    a female thread defined on an internal surface of the clamping cylindrical article, corresponding to said male thread of the rotational article; and
    a braking means interposed pressedly between the outside of the rotational article and the inside of the clamping cylindrical article;
    whereby the rotational driving means enables the clamping cylindrical article to rotate with the rotational article within a given angle of rotation and otherwise enables the rotational article to rotate alone so as to move the clamping cylindrical article forwards and backwards in a meshed condition of the male and female threads of the rotational and clamping cylindrical articles.

4. A tool clamping apparatus as defined in claim 3, wherein said braking means is formed in an elastic ring.

5. A tool clamping apparatus as defined in claim 2, wherein said driving spindle and said tool driving shaft are provided mutually with a guide means for assisting in fitting the attachment into the mounted part of the machine tool, the guide means comprising a guide pin which is provided in one end of the driving shaft and is biased outwards by a buffer spring, and a guide hole which is defined in the rear end of the tool driving shaft so as to receive the base guide pin.

6. A tool clamping apparatus as defined in claim 1 or 2, wherein said rotational driving means comprises:
    a male thread and a transmission gear defined on an external face of said clamping cylindrical article;
    a female thread defined on an internal face of the tool mounted part of the machine tool so as to engage with said said male thread; and
    a driving gear for engaging with the transmission gear.

7. A tool clamping apparatus as defined in claim 1, wherein said rotational driving means comprises:
    a cam groove defined on the external surface of the rotational article; and a cam pin projecting from the inside of the clamping cylindrical article.

8. A tool clamping apparatus as defined in claim 1, wherein said rotational driving means comprises:

a cam groove defined on the internal face of the tool mounted part of the machine tool; and
a cam pin projecting from the outside of the clamping cylindrical article.

* * * * *